United States Patent [19]

Saitoh et al.

[11] Patent Number: 4,958,296

[45] Date of Patent: Sep. 18, 1990

[54] WATER-LEAKAGE DETECTING APPARATUS AND METHOD WHICH ARE LITTLE INFLUENCED BY NOISE

[75] Inventors: Susumu Saitoh; Syozo Taniguchi; Akio Enomoto; Teruyoshi Matsuzawa, all of Tokyo, Japan

[73] Assignee: Kabushiki Kaisha Toshiba, Kawasaki, Japan

[21] Appl. No.: 472,434

[22] Filed: Jan. 31, 1990

Related U.S. Application Data

[63] Continuation of Ser. No. 222,410, Jul. 21, 1988, abandoned.

[30] Foreign Application Priority Data

Jul. 22, 1987 [JP] Japan .................... 62-180939

[51] Int. Cl.$^5$ .................................................. G01M 3/08
[52] U.S. Cl. ............................. 364/509; 340/605; 73/40; 73/40.5 A; 73/592
[58] Field of Search ............... 364/508, 509, 510, 574, 364/575; 340/604, 605, 683; 73/40, 40.5 A, 49.1, 49.2 R, 49.3, 592

[56] References Cited

U.S. PATENT DOCUMENTS 3,019,650 2/1962 Worswick .................... 73/290 Z

FOREIGN PATENT DOCUMENTS 60-209117 10/1985 Japan .
61-223628 4/1986 Japan .
61-213647 9/1986 Japan .
62-55539 3/1987 Japan .

*Primary Examiner*—Kevin J. Teska
*Assistant Examiner*—Brian M. Mattson
*Attorney, Agent, or Firm*—Oblon, Spivak, McClelland, Maier & Neustadt

[57] ABSTRACT

A sensor detects a vibration generated due to water leakage. An integration circuit integrates time intervals for which a signal obtained by absolute-value amplifying an output signal from the sensor exceeds a predetermined level within a predetermined period of time. The integration circuit performs the integration a plurality of times. A detection circuit selects a minimum value of a plurality of integration values obtained by the plurality of measurements as an integration value obtained when the influence of unrelated noise is at a minimum and compares the minimum value with a preset reference value. When the minimum value exceeds the reference value, the detection circuit determines the presence of water leakage, and when the minimum value is smaller than the reference value, determines the absence of water leakage.

18 Claims, 1 Drawing Sheet

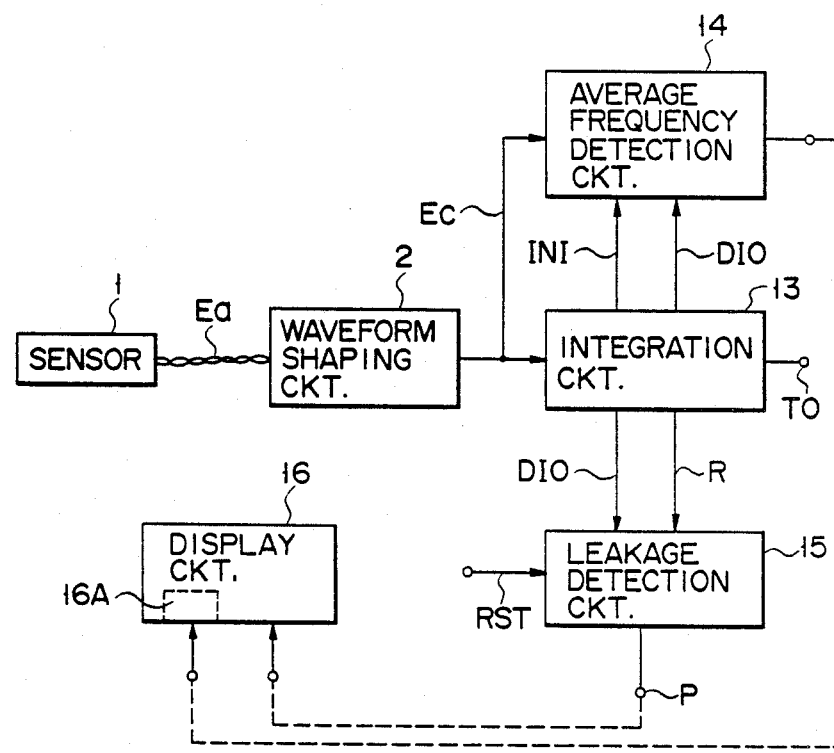
F I G. 7

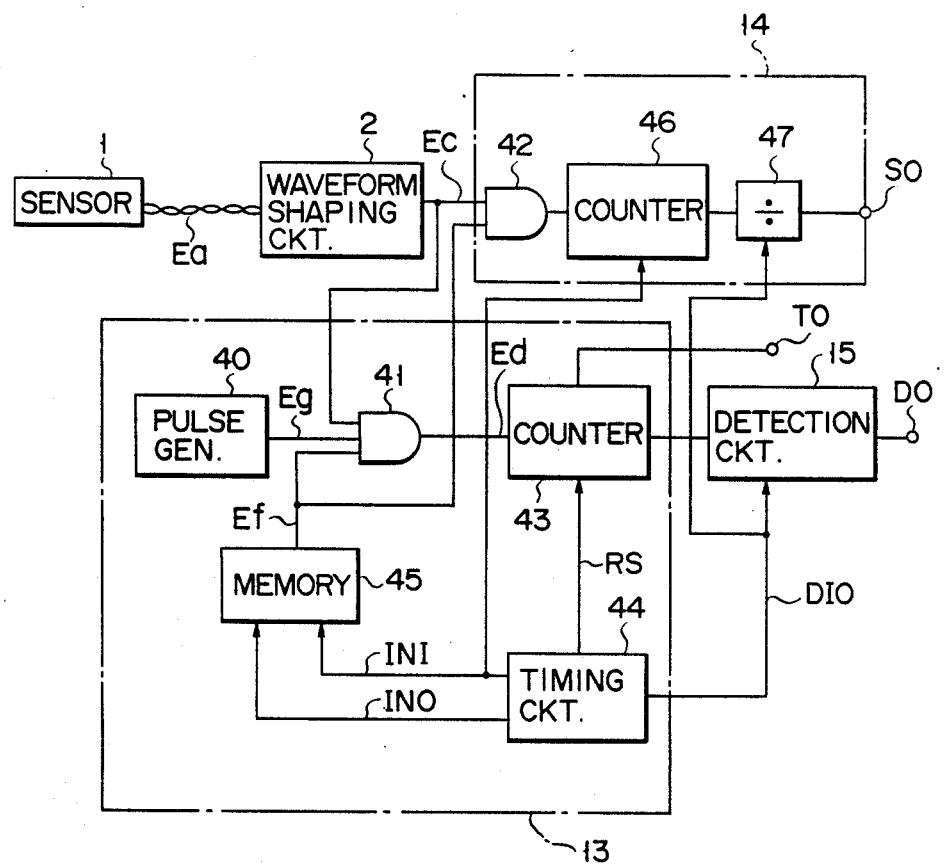
F I G. 8

WATER-LEAKAGE DETECTING APPARATUS AND METHOD WHICH ARE LITTLE INFLUENCED BY NOISE

This application is a continuation of application Ser. No. 07/222,410, filed on July 21, 1988, now abandoned.

Background of the Invention

1. Field of the Invention

The present invention relates to an apparatus for detecting the presence/absence of water leakage from a water pipe.

2. Description of the Related Art

A large amount of water leaking from conduit pipes, service pipes and the like for carrying water from filtration plants, reservoirs and the like for supplying water to consumers leads to a great loss. It is, therefore, necessary to detect the occurrence of water leakage and reduce the quantity of water leakage. However, it is difficult to find water leakage portions on the ground because most of the water leakage portions are present underground.

According to a conventional method of detecting underground water leakage, a vibration of a service pipe is amplified and converted into an audible tone, whereupon an inspector listens to the audible tone, and then judges the presence/absence of water leakage. According to this method, however, the inspector must attain a skill for distinguishing noise generated by water leakage from other types of unrelated noise. In addition, according to this method, the inspector must circulate within areas in which the conduit pipes are embedded and must check the presence/absence of water leakage, thus requiring much labor and time-consuming operations.

In order to overcome the above drawback, an apparatus for automatically detecting water leakage is disclosed in, e.g. Japanese Patent Disclosure (Kokai) No. 60-209117. This leakage detecting apparatus detects the presence/absence of water leakage by utilizing the following facts. Once water leakage occurs, it cannot be naturally recovered. Unless water leakage is repaired, noise continuously occurs. More specifically, in the leakage detecting apparatus disclosed in the above disclosure, a sensor converts a vibration of a water pipe into an electrical signal, and the electrical signal is supplied to a waveform shaping circuit. The waveform shaping circuit absolute-value amplifies the electrical signal from the sensor, compares the electrical signal with a threshold level and converts it into a high level signal or a low level signal. An integration circuit integrates the period of time that the output signal remains at a high level within a predetermined period of time. A detection circuit detects water leakage when the integrated period of time exceeds a predetermined reference value.

Usually, the integration circuit is operated at nighttime (e.g. 1 AM to 4 AM) when unrelated outside noise is at a minimum. Thus, the probability of a water leakage detection error caused by unrelated outside noise is reduced. However, unrelated noise exists even at nighttime. In particular, noise from nighttime construction and noise from a pump for pumping water from a water tank to a high-level water tank are often generated for relatively long periods of time. For this reason, when the conventional water leakage detecting apparatus is used near a site of nighttime construction or of a water tank pump, the apparatus erroneously detects water leakage.

A method of automatically detecting a position of water leakage is disclosed in Japanese Patent Publication No. 43-18600. According to the method of this publication, correlation between output signals from two sensors is obtained, and a time difference between the two output signals is used to determine the position of water leakage. According to this method, however, at least two sensors must be used to detect the position of water leakage. It is also difficult to perform measurement such as calculation of correlation between output signals from the two sensors. An apparatus arranged by using this method becomes bulky. With this method, however, a detection error may occur. When the water supplied through the service pipe is used, it may be detected as if the water were leaking from the pipe. Therefore, it is necessary to use this method at night when a relatively small amount of water is used.

Summary of the Invention

It is an object of the present invention to provide an apparatus for detecting water leakage, which is little influenced by noise. An apparatus for detecting water leakage according to the present invention comprises:

vibration detection means for detecting a vibration generated due to water leakage;

integration means, connected to the detection means, for integrating a time interval for which a vibration level of the vibration detected by the detection means exceeds a predetermined value within a predetermined period of time, the integration means performing the integration a plurality of times to obtain a plurality of integration values; and determination means for receiving the plurality of integration values calculated by the integration means, for selecting a minimum value of the plurality of integration values as an integration value obtained when the influence of noise is minimum, for comparing the selected minimum value with a preset reference value, and for, when the minimum value exceeds the reference value, determining a presence of water leakage, and when the minimum value is smaller than the reference value, determining an absence of water leakage.

With the above arrangement, the presence/absence of water leakage is detected on the basis of an integration value obtained when unrelated noise is substantially at a minimum. Therefore, the presence/absence of water leakage can be accurately detected.

Brief Description of the Drawings

FIGS. 7 and 8 are block diagrams showing an arrangement of the apparatus for detecting water leakage according to the second embodiment.

Detailed Description of the Preferred Embodiments

An apparatus for detecting water leakage according to an embodiment of the present invention will be described with reference to the accompanying drawings.

An arrangement of the apparatus for detecting water leakage of this embodiment will be described with reference to FIG. 1.

Figure 1:
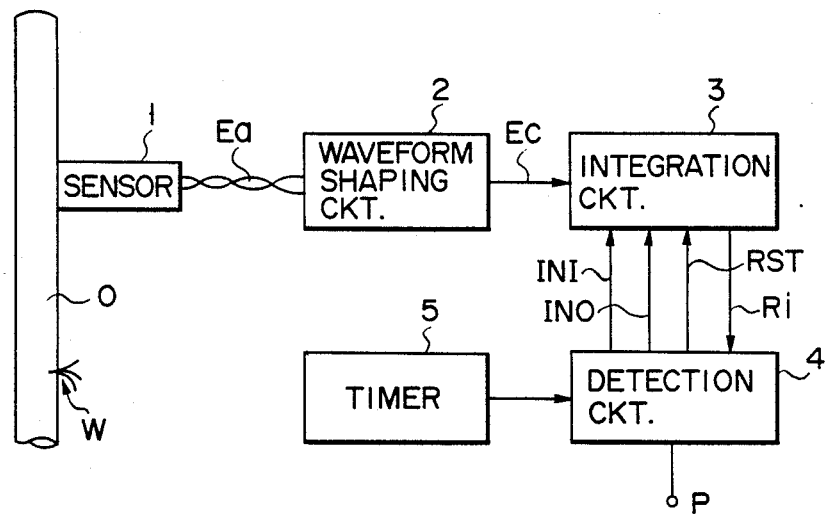
FIGS. 1 and 2 are block diagrams showing a circuit arrangement of an apparatus for detecting water leakage according to a first embodiment of the present invention.

Referring to FIG. 1, sensor 1 is arranged on, e.g. water pipe 0. Sensor 1 converts a displacement, a speed, or an acceleration of a wall surface of water pipe 0 into an electrical signal. An output signal from sensor 1 is supplied to waveform shaping circuit 2. Waveform shaping circuit 2 amplifies an absolute value of output signal Ea from sensor 1 and compares a signal having an amplified absolute value with a predetermined reference voltage (i.e. a threshold level). A portion of the signal from the waveform shaping circuit 2, which exceeds the reference voltage, is converted into a signal of logic "1" having a predetermined voltage. However, a signal portion having a level lower than the predetermined voltage is converted into a signal of level "0".

Output signal Ec from waveform shaping circuit 2 is supplied to integration circuit 3. Integration circuit 3 integrates a period of time when it is kept at a logic level and outputs the resultant time integration value R.

Detection circuit 4 is connected to integration circuit 3. Detection circuit 4 receives time integration value R and detects the presence/absence of water leakage on the basis of time integration value R. In addition, detection circuit 4 outputs integration start signal INI, integration end signal INO, and reset signal RST to control integration circuit 3.

Timer 5 is connected to detection circuit 4. Timer 5 obtains integration start time and integration end time of the integration circuit 3 and outputs an interrupt signal to detection circuit 4 at predetermined intervals.

Figure 2:
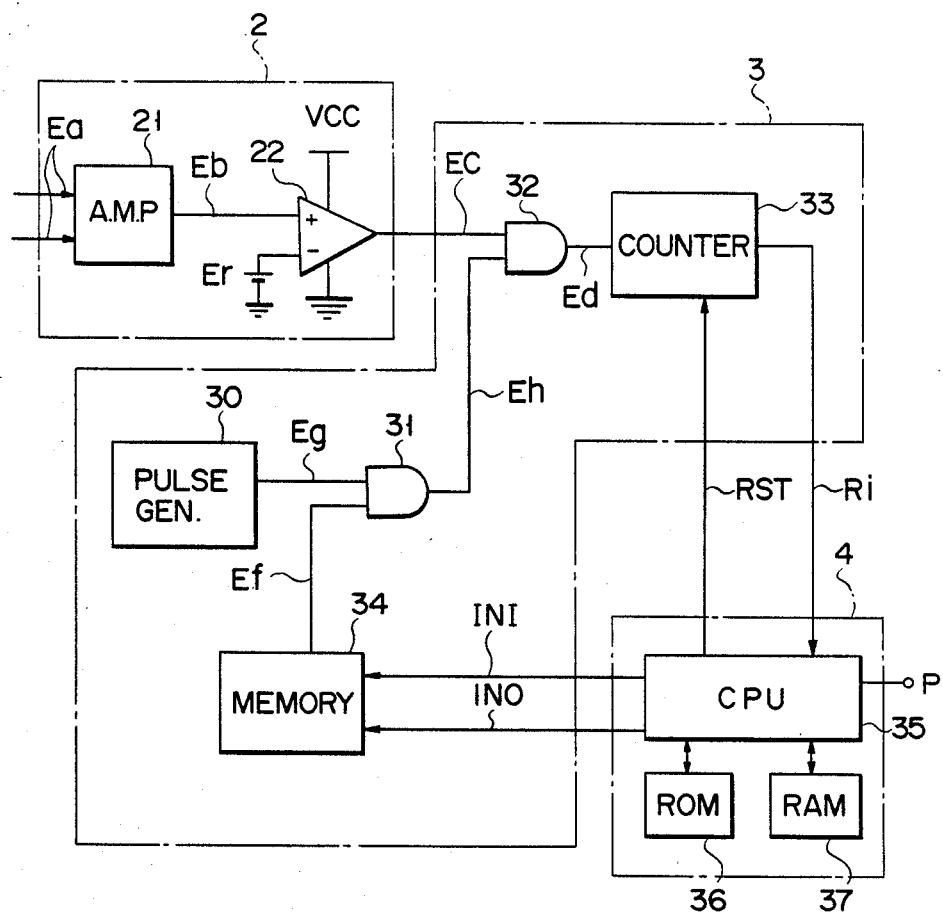
Figure 3:
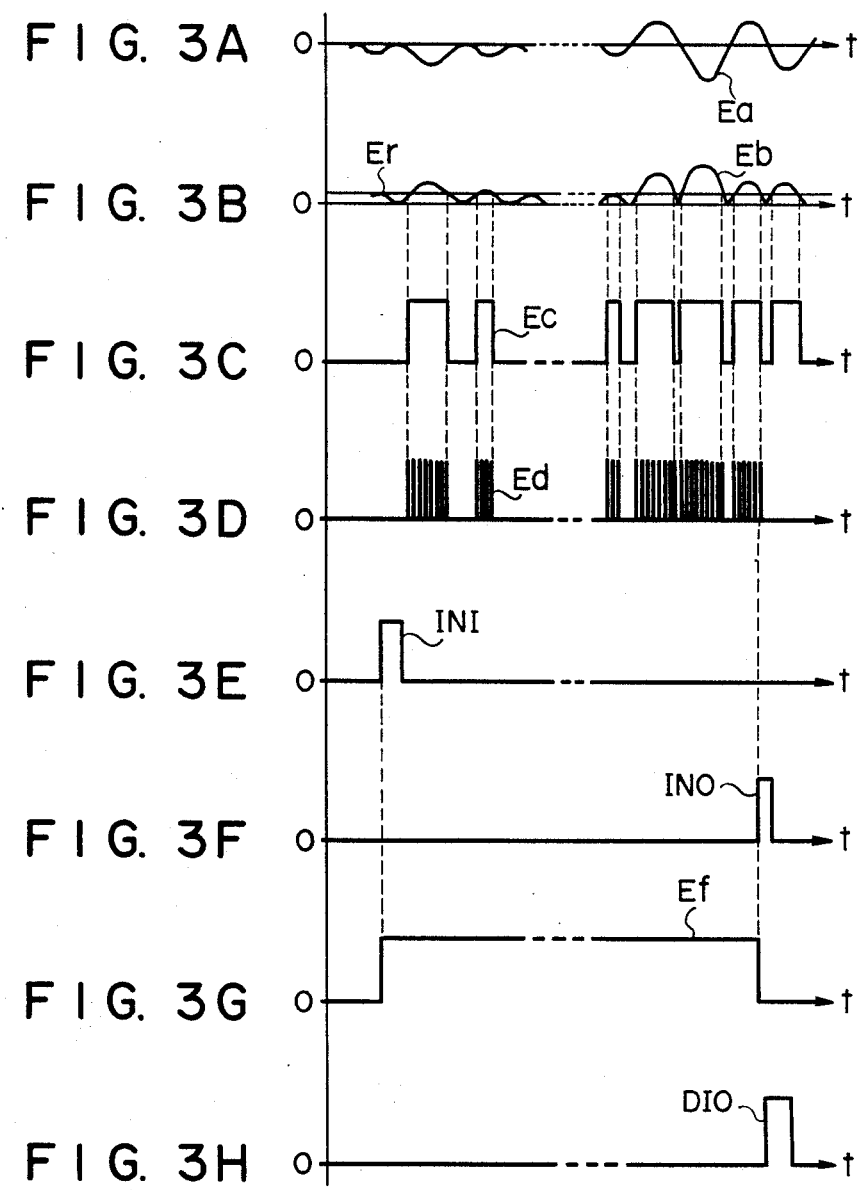
FIGS. 3A to 3G are timing charts for explaining operations of apparatuses for detecting water leakages according to the first embodiment and a second embodiment of the present invention.
FIG. 3H is a timing chart for explaining an operation of the apparatus for detecting water leakage according to the second embodiment of the present invention.

Detailed arrangements of waveform shaping circuit 2, integration circuit 3 and detection circuit 4 shown in FIG. 1 will be described with reference to FIG. 2.

Output signal Ea from sensor 1 is supplied to absolute value amplifier 21. Output signal Eb from absolute value amplifier 21 is supplied to the noninverting input terminal of comparator 22. The inverting input terminal of comparator 22 receives reference voltage Er. When a voltage of signal Eb exceeds reference voltage Er, comparator 22 outputs a signal having a voltage substantially equal to power source voltage Vcc. However, when the voltage of signal Eb is lower than reference voltage Er, comparator 22 outputs a ground voltage.

Integration start signal INI and integration end signal INO output from detection circuit 4 are supplied to memory 34. Memory 34 comprises, e.g. an RS flip-flop, the set terminal of which receives signal INI, and the reset terminal of which receives signal INO. Memory 34 maintains a logic "1" state between an input of integration start signal INI and an input of integration end signal INO. Output signal Ef from memory 34 is supplied to one input terminal of AND gate 31. The other input terminal of AND gate 31 is connected to pulse generator 30. Pulse generator 30 generates pulse signal Eg having a predetermined period. AND gate 31 calculates an AND signal of output signal Ef from memory 34 and output signal Eg from pulse generator 30 and outputs the AND signal as signal Eh. That is, AND gate 31 outputs pulse signal Eh having a predetermined period between an output timing of integration start signal INI and an output timing of integration end signal INO.

Signal Eh from AND gate 31 is supplied to one input terminal of AND gate 32. Output signal Ec from waveform shaping circuit 2 is supplied to the other input terminal of AND gate 32. AND gate 32 calculates an AND signal of signals Eh and Ec. That is, AND gate 32 outputs pulse signal Ed having a predetermined period between an output timing of integration start signal INI and an output timing of integration end signal NO while signal Ec is kept at logic "1".

Counter 33 receives output signal Ed from AND gate 32 and counts pulses included in signal Ed. The number of counted pulses indicates the integration value R of "1"-level time periods of signal Ec from the output timing of integration start signal INI to the output timing of integration end signal INO. Counter 33 is reset in response to reset signal RST.

Detection circuit 4 comprises a microcomputer including central processing unit (CPU) 35, ROM 36 for storing operation programs of CPU 35, permanent data and the like, and RAM 37 for storing data and the like.

The operation of the water leakage detecting apparatus shown in FIGS. 1 and 2 will be described with reference to the timing charts shown in FIGS. 3A to 3G and the flowchart shown in FIG. 4.

When the power switch (not shown) of the water leakage detecting apparatus is turned on, sensor 1 detects a vibration of a pipe wall of water pipe 0 and outputs signal Ea as shown in FIG. 3A. Absolute value amplifier 21 absolute-value amplifies signal Ea and outputs signal Eb as shown in FIG. 3B. Comparator 22 compares signal Eb with preset reference voltage Er. Comparator 22 converts a signal portion where the voltage of signal Eb is higher than reference voltage Er into a signal of a constant high voltage, converts a signal portion where the voltage of signal Eb is lower than reference voltage Er into a signal of 0 V, and then, outputs the obtained signal to integration circuit 3. Pulse generator 30 continuously outputs pulse signal Eg having a predetermined period.

Figure 4:
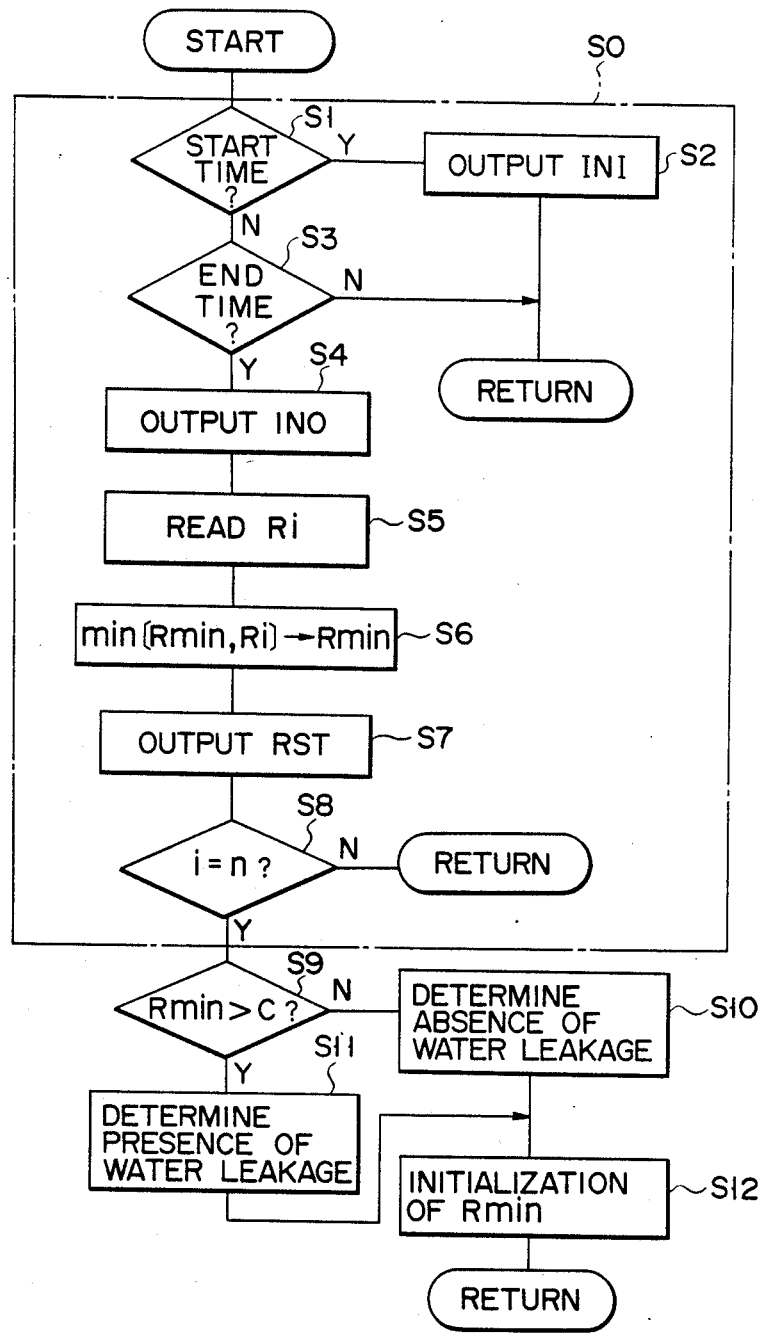
FIGS. 4 and 5 are flowcharts for explaining operations of the apparatus for detecting water leakage according to the first embodiment.

In the above assumption, when an interruption signal periodically output from timer 5 is received, detection circuit 4 performs water leakage detection processes as shown in the flowchart of FIG. 4.

First, it is checked if one of a plurality of integration start times preset in ROM 36 (e.g. AM 0:00, 1:00, 2:00, 3:00) coincides with a time output from timer 5 (step S1).

If a noncoincidence is detected in step S1, it is checked if one of a plurality of preset integration end times (e.g. AM 0:40, 1:40, 2:40, 3:40) coincides with an output time from timer 5 (step S3). If a noncoincidence is detected in step S3, control returns to an interruption standby program.

After a time has passed, if the present time coincides with one of the integration start times, a coincidence is detected in step S1, and detection circuit 4 outputs integration start signal INI as shown in FIG. 3E (step S2). Upon reception of integration start signal INI, memory 34 is set and outputs signal Ef at logic level "1", as shown in FIG. 3G. In response to signal Ef of logic level "1", AND gate 31 outputs pulse signal Eg from pulse generator 30 as signal Eh. AND gate 32 receives signal Ec and pulse signal Eh. When signal Ec is at "1" level, AND gate 32 outputs pulse signal Ed as shown in FIG. 3D. Counter 33 counts the number of pulses included in signal Ed output from AND gate 32.

During execution of the above operation, timer 5 periodically outputs an interruption signal, and steps S1 and S3 are repeated. If a predetermined period of time has passed from the output timing of integration start signal INI, it is determined in step S3 that the present time coincides with one of the interruption end times. Detection circuit 4 outputs integration end signal INO to integration circuit 3 as shown in FIG. 3F (step S4).

Upon reception of integration end signal INO, memory 34 is reset, as shown in FIG. 3G, and both signals Ef and Eh go to logic level "0". Signal Ed also goes to logic level "0", as shown in FIG. 3D. Therefore, counter 33 stops a count-up operation. The count value of counter 33 in this state indicates the integration value (total sum) R of "1"-level time periods of output signal Ec from waveform shaping circuit 2 during an interval from the output timing of integration start signal INI to the output timing of integration end signal INO.

Detection circuit 4 reads out time integration value Ri indicated by the count value of counter 33 in step S5. In this case, suffix i means ith measurement. Detection circuit 4 compares currently obtained time integration value Ri with minimum value Rmin of the stored time integration values, and stores the smaller one as the new minimum value Rmin (step S6). Detection circuit 4 outputs reset signal RST to reset counter 33, thus preparing for the next measurement. Detection circuit 4 then checks if measurement count i has reached predetermined count n (e.g., 4) (step S8). If NO in step S8, control returns to the interruption standby program.

If measurement count i is equal to preset count n, control advances to step S9.

In step S9, detection circuit 4 compares preset threshold value C with finally obtained minimum value Rmin. If minimum value Rmin is larger than threshold value C, detection circuit 4 determines the presence of water leakage and outputs water leakage detection if signal to terminal P (step S11). In contrast to this, if measurement value Rmin is smaller than threshold value C, detection circuit 4 outputs to terminal P a signal indicating the absence of water leakage (step S10).

Thereafter, in step S12, in order to initialize minimum value Rmin, a sufficiently large value is set as minimum value Rmin, and control then returns to the interruption standby program.

In this embodiment, the measurement is performed a plurality of times, and time integration value Ri is obtained during each measurement period. Minimum value Rmin of the obtained time integration values Ri is compared with threshold value C to determine the presence/absence of water leakage. A noise component always has an interrupted period even if it is due to the unrelated noise of a construction site or water tank pump. Therefore, in this embodiment, minimum value Rmin is regarded as a measurement value when the noise component is minimum, and the presence/absence of water leakage is determined using this minimum value Rmin. Thus, the influence of noise can be removed or eliminated. Therefore, erroneous detection of a water leakage due to unrelated noise can be prevented.

In the above embodiment, 40-minute measurements are performed four times during a time interval from AM 0:00 to AM 4:00, during which interval noise is considered to be relatively small. However, the present invention is not limited to the case wherein measurement is performed a plurality of times during a specific time interval. For example, integration start times, integration end times, integration measurement count, and the like can be arbitrarily set. For example, 1-hour measurement may be performed 24 times during a time interval from 0:00 to 24:00. For example, if a measurement period, a measurement interval, and a measurement count are set so that measurement is performed n times for two days, the presence/absence of water leakage is repetitively detected at every 2-day interval.

The present invention is not limited to the above embodiment. For example, after every n time measurement is completed, water leakage may be determined using minimum value Rmin of the measurement values of the least m×n measurement.

Figure 5:
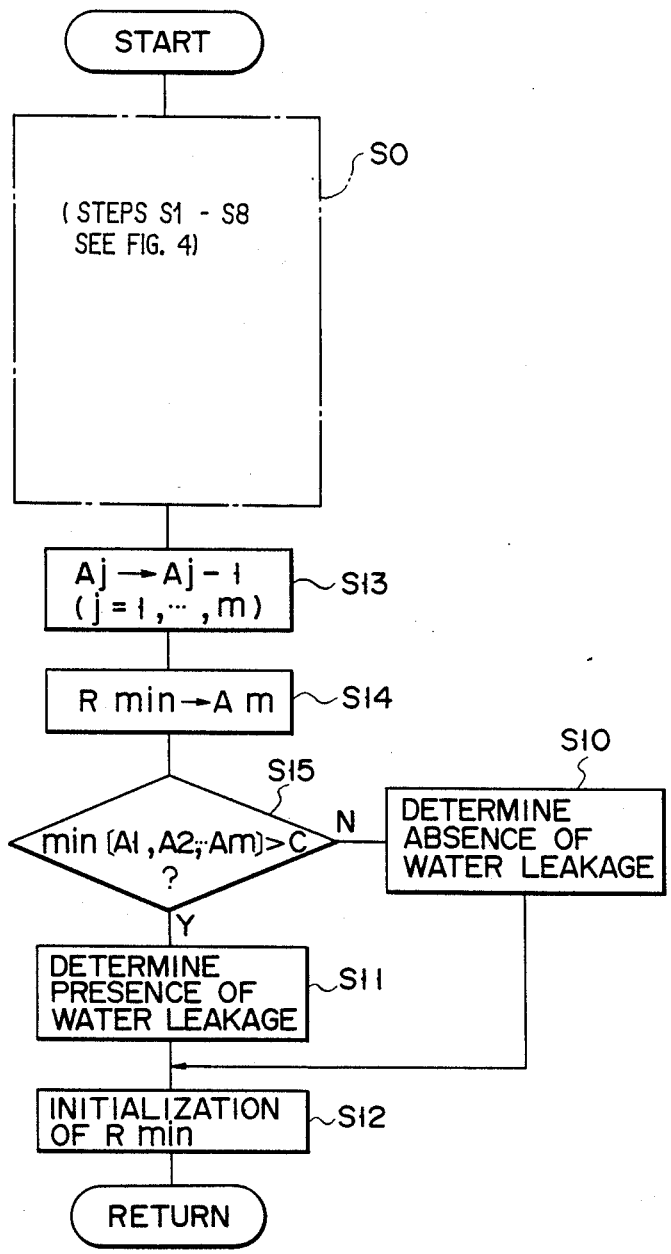

FIG. 5 shows an operation of a water leakage detecting apparatus which performs measurement n times a day, and everyday, the presence/absence of water leakage is detected using minimum value Rmin of the measurement value of the past m days including the day of measurement. In the flowchart shown in FIG. 5, a portion surrounded by dotted line S0 is substantially the same as a portion surrounded by dotted line S0 in FIG. 4, and a detailed description thereof will be omitted. After n measurements of a certain day are ended by steps in the portion surrounded by dotted line S0 in FIG. 5, control advances to step S13. In step S13, minimum value A(j-1) (j=1, 2, . . . , m) of time integration values of a (j−1)th day is replaced with minimum value Aj of a jth day. Then, minimum value Rmin of the latest n time integration values Ri (of the day in this embodiment) is given as minimum value Am of an mth day (step S14). Thus, minimum values Aj of time integration values for recent m days can always be retained. Thereafter, the smallest value of minimum values Aj of time integration values for the latest m days is compared with threshold value C, thus detecting the presence/absence of water leakage (step S15). Note that steps S10, S11, and S12 are the same as those in FIG. 3.

If the apparatus is operated as shown in FIG. 5, even if a great amount of unrelated noise is generated throughout a specific day, erroneous detection of water leakage can be prevented.

The water leakage detecting apparatus according to the first embodiment can detect the presence/absence of water leakage, but cannot detect the distance from a sensor mounting position to a water leakage position. A water leakage detecting apparatus according to a second embodiment of the present invention can also detect this distance to a water leakage position.

Figure 6:
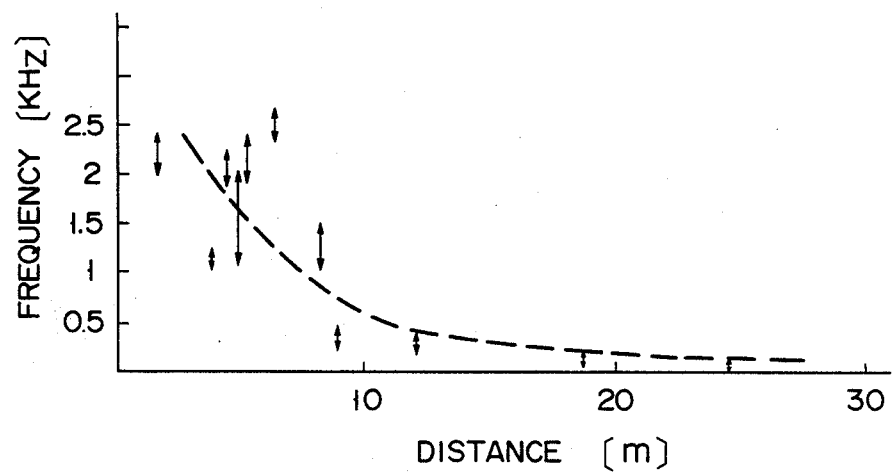
FIG. 6 is a graph showing a relationship between the distance to a water leakage position and a first peak frequency of a signal generated by water leakage.

A technique for obtaining a distance to a water leakage position according to the present invention is based on the test result in that "a high-frequency component of a vibration transmitting through a water pipe is attenuated as a transmission length is increased, and the main component of the frequency of a vibration generated due to water leakage has a predetermined relationship with the distance to the water leakage position". FIG. 6 shows an example of the test result. FIG. 6 shows measurement results of 11 samples of water leakage detected in an urban district by practicing this method. In FIG. 6, the maximum level frequency resulting from spectrum-analysis of a frequency of a vibration is plotted along the ordinate, and the distance from a sensor mounting position to a water leakage position is plotted along the abscissa.

An arrangement of an embodiment of a water leakage detecting apparatus which can detect a distance to a water leakage position based on the above principle will be described with reference to FIG. 7.

In FIG. 7, the arrangements of sensor 1 and waveform shaping circuit 2 are substantially the same as those shown in FIG. 1. Output signal Ec from waveform shaping circuit 2 is supplied to integration circuit 13. Integration circuit 13 calculates an integration value of "1"-level time periods of signal Ec during a time interval from a predetermined integration start time to an integration end time.

Output signal Ec from waveform shaping circuit 2 is also supplied to average frequency detection circuit 14. Detection circuit 14 calculates an average frequency of output signal Ea from sensor 1 during a time interval from the predetermined integration start time to the integration end time.

Detection circuit 15 is connected to integration circuit 13, and compares time integration value R calculated by integration circuit 13 with preset threshold value C so as to determine the presence/absence of water leakage.

Display 16 is connected to detection circuits 14 and 15. Display 16 displays the presence/absence of water leakage determined by detection circuit 15, and the average frequency calculated by detection circuit 14.

A detailed arrangement of integration circuit 13 and average frequency detection circuit 14 shown in FIG. 7 will be described hereinafter with reference to FIG. 8.

Integration circuit 13 includes timing circuit 44 which outputs integration start signal INI at a predetermined integration start time and outputs integration end signal INO at a predetermined integration end time. Memory 45 is set in response to integration start signal INI and is reset in response to integration end signal INO. Output signal Ef from memory 45 is supplied to one input terminal of AND gate 42. Output signal Ec from waveform shaping circuit 2 is input to the other input terminal of AND gate 42. The output signal from AND gate 42 is supplied to counter 46 which counts the number of pulses included in the input signal. The count value of counter 46 is supplied to division circuit 47. The output signal from division circuit 47 is supplied to display 16 as an output signal from average frequency detection circuit 14.

Output signal Ec from waveform shaping circuit 2, output signal Ec from pulse generator 40, and output signal Ef from memory 45 are supplied to AND gate 41. Output signal Ed from AND gate 41 is supplied to counter 43. Counter 43 counts the number of pulses included in output signal Ed from AND gate 41. The count value is output to terminal T0 and is also supplied to detection circuit 15. Rest signal RS output from timing circuit 44 is supplied to the reset terminal of counter 43. Detection instruction signal output from timing circuit 44 is supplied to detection circuit 14 and division circuit 47. Integration start signal INI is supplied to the reset terminal of counter 46.

The operation of the circuit shown in FIGS. 7 and 8 will be described below.

When a power switch is turned on, sensor 1 detects a vibration of a wall of a water pipe and outputs signal Ea, as shown in FIG. 3A. Waveform shaping circuit 2 absolute-value amplifies output signal Ea from sensor 1 and outputs signal Eb shown in FIG. 3B. Waveform shaping circuit 2 compares signal Eb with reference voltage Er and converts a signal portion which is higher than reference voltage Er into a signal of a predetermined voltage, and a signal portion which is lower than reference voltage Er into a signal of 0 V. Pulse generator 40 continuously outputs a pulse signal of a predetermined period.

When the present time has reached a predetermined integration start time, timing circuit 44 outputs integration start signal INI to memory 45, as shown in FIG. 3E. In response to integration start signal INI, memory 45 is set and outputs signal Ef of logic level "1", as shown in FIG. 3G. In response to signal Ef of logic level "1", AND gate 42 directly outputs signal Ec from waveform shaping circuit 2, as shown in FIG. 3C. Counter 46 counts the number of pulses included in the output signal from AND gate 42.

In response to signal Eg of logic level "1", AND gate 41 ANDs signal Ec and pulse signal Eg and outputs pulse signal Ed shown in FIG. 3D. Counter number of pulses included in output signal Ed from AND gate 41.

When the present time has reached an integration end time, timing circuit 44 outputs integration end signal INO to memory 45, as shown in FIG. 3F. In response to integration end signal INO, memory 45 is reset and outputs signal Ef of logic level "0". Thus, AND gates 41 and 42 stop outputting of pulse signals, and counters 43 and 46 stop the count-up operation. In this state, the count value held in counter 43 indicates integration value R of "1"-level time periods of output signal Ec from waveform shaping circuit 2 during a time interval between an output timing of integration start signal INI to an output timing of integration end signal INO. The count value held by counter 46 indicates the number of pulses included in output signal Ec during a time interval between the output timing of integration start signal INI to the output timing of integration end signal INO.

After signal INO is output, timing circuit 44 outputs detection execution signal DIO shown in FIG. 3H.

Upon reception of detection execution signal DIO, division circuit 47 divides the count value of counter 46 with second count S×2 from the output timing of signal INI to the output timing of signal INO. Thus, the average frequency of output signal Ea from sensor 1 from the output timing of signal INI to the output timing of signal INO can be calculated.

Upon reception of detection execution signal DIO, detection circuit 15 compares time integration value R indicated by the count value of counter 43 with preset threshold value C. If time integration value R is larger than threshold value C, detection circuit 15 determines the presence of water leakage and outputs a signal indicating the presence of water leakage to terminal P. Oppositely, if time integration value R is smaller than threshold value C, detection circuit 15 determines the absence of water leakage and outputs a signal indicating the absence of water leakage to terminal P.

Display 16 displays the presence/absence of water leakage in response to the output signal from detection circuit 15. When water leakage is detected, display 15 displays the average frequency based on the output signal from division circuit 47.

After detection execution signal DIO is output, reset signal RST is output, and counter 43 is cleared. On the other hand, counter 46 is cleared in response to integration start signal INI. Detection circuit 15 starts its operation in response to detection execution signal DIO. Thus, detection of the presence/absence of water leakage and the average frequency can be held at least until the next measurement is started.

With the above arrangement, an operator can only check display 16 to learn of the presence/absence of water leakage. In addition, the distance to a water leakage position can be calculated based on the graph shown in FIG. 6.

Note that the relationship between the distance and frequency shown in FIG. 6 changes in accordance with the material and type of pipe through which a vibration is transmitted. If the material of the pipe is changed, a curve representing the relationship between frequency and distance has a standard well-defined from, and the distance can be accurately calculated by detecting the material of the pipe.

With the above arrangement, the presence/absence of water leakage and distance to a water leakage position can be calculated by a single measuring apparatus.

In the second embodiment described above, the time integration value and the average frequency are measured a plurality of times, and minimum value Rmin of time integration values R is compared with threshold value C, so that the presence/absence of water leakage can be determined free from the influence of unrelated noise or the like. In this case, the water leakage detecting apparatus compares minimum value Rmin of a plurality of time integration values Ri calculated by a plurality of measurements with threshold value C to detect the presence/absence of water leakage. The distance to a water leakage position is calculated using an average frequency when minimum value Rmin is obtained. With this arrangement, the presence/absence of water leakage and the distance to the water leakage position can be measured without influence from unrelated noise.

In this embodiment, the average frequency is displayed on display 16. However, arithmetic circuit 16A, for example, can be arranged in display 16 so that arithmetic circuit 16A calculates a distance from the calculated average frequency in accordance with FIG. 6, and display 16 displays the calculated distance.

The water leakage detecting apparatus of this embodiment has a relatively simple, low-cost arrangement. For this reason, the water leakage detecting apparatus can be attached to a water meter installed in each home.

In the above embodiment, threshold value C and reference voltage Er must not be a value so low as to detect water leakage if no water leakage is occurring and must also not be a value so high as not to detect water leakage if water leakage is, in fact, occurring.

In the above embodiment, sensor 1 is attached to water pipe 0. However, the present invention is not limited to this. For example, the sensor may be attached to any place such as a fire plug, water meter, a water control valve, and the like where a vibration or noise generated by water leakage is transmitted.

In the above embodiment, the output signal from sensor 1 is absolute-value amplified, and time intervals for which the amplified signal exceeds predetermined reference voltage Er are integrated. However, the present invention is not limited to this. For example, an envelope of output signal Eb from absolute value amplifier 21 is calculated, and time intervals for which the envelope exceeds the threshold value may be integrated. For example, an average level per unit time of absolute-value amplified signal Eb is calculated, and time intervals for which the average level exceeds the threshold value may be integrated. Similarly, an effective value per unit time of AC output signal Ea from sensor 1 is calculated, and a time interval for which the effective value exceeds the threshold value may be integrated.

In the above embodiment, the period of the pulse signal generated by pulse generator 30 or 40 is preferably 4 times or more the frequency of signal Ec. This is to accurately calculate a "1"-level period of signal Ec. Therefore, when waveform shaping circuit 2 includes a low-pass filter, the pulse signal preferably has a frequency about 4 times the cutoff frequency of the filter.

In the above embodiment, the average frequency is regarded to be substantially equal to a first peak frequency, so that a distance to a water leakage position can be calculated by a simple arrangement. However, the present invention is not limited to this. For example, the first peak frequency of the detected vibration can be accurately obtained using a frequency analyzer, and the distance to a water leakage position can be calculated based on this first peak frequency.

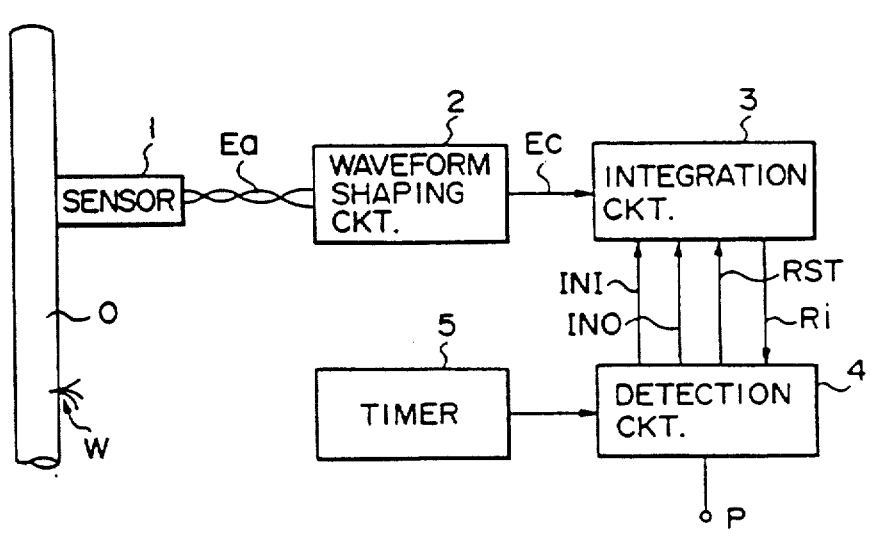

What is claimed is:

1. A water leakage detecting apparatus comprising:
vibration detection means for detecting a vibration generated due to water leakage;
integration means, connected to said detection means, for integrating over a predetermined time period each time interval for which a vibration level of the vibration detected by said detection means exceeds a predetermined value, said integration means performing the integration over a plurality of said predetermined time periods to obtain a plurality of integration values; and
determination means for receiving the plurality of integration values calculated by said integration means, for selecting a minimum value of the plurality of integration values as an integration value obtained when an influence of noise is minimum, for comparing the selected minimum value with a preset reference value, and for, when the minimum value exceeds the reference value, determining a presence of water leakage, and when the minimum value is smaller than the reference value, determining an absence of water leakage.

2. The apparatus according to claim 1, wherein said determination means selects a minimum value of n integration values obtained by an n-time integration whenever said integration means performs the integration n times, compares the minimum value with the preset reference value, and determines the presence of water leakage when the minimum value exceeds the preset reference value and the absence of water leakage when the minimum value is smaller than the preset reference value.

3. The apparatus according to claim 1, wherein said determination means selects a minimum value of integration values obtained by m-time integration including a current integration cycle whenever the integration of said integration means is completed, compares the minimum value with the preset reference value, and determines the presence of water leakage when the minimum value exceeds the preset reference value and the absence of water leakage when the minimum value is smaller than the preset reference value.

4. The apparatus according to claim 1, wherein said integration means comprises:
amplifying means for amplifying an absolute value of an output signal of said vibration detection means;
comparing means, connected to said amplifying means, for comparing a signal level of an output signal from said amplifying means with a predetermined reference level, and outputting a signal representing a comparison result;

integrator means connected to the output signal from said comparing means and responsive to the output signal from said comparing means to integrate a time interval for which the output signal from said amplifying means exceeds the reference level;

timer means for measuring a time lapse;

means, connected to said timer means, for storing a plurality of integration start timings and a plurality of integration end timings; and control means, connected to said timer means and said timing storing means, for starting said integrator means when an output signal from said timer means represents one of the integration start timings, interrupting an operation of said integrator means when the output from said timer means represents one of the integration end timings, and storing an integration result obtained by said integrator means.

5. The apparatus according to claim 1, wherein said integration means comprises:

amplifying means for amplifying an absolute value of an output signal from said vibration detection means;

pulse generating means for outputtinq a pulse signal having a predetermined period;

gate means, connected to said amplifying means and said pulse generating means, for comparing a signal level of an output signal from said amplifying means with a predetermined reference value level, and gating the pulse signal when the signal level of the output signal from said amplifying means exceeds the reference level; and counting means for counting the number of pulses included in an output signal from said gate means within the predetermined period of time.

6. The apparatus according to claim 1, wherein said vibration detection means detects the vibration of a water pipe for supplying water.

7. The apparatus according to claim 1, wherein said vibration detection means detects the vibration of a fireplug appearing on the ground.

8. A method of detecting water leakage, comprising the steps of:

detecting whether current time coincides with a plurality of predetermined integration start timings;

upon each detection that current time coincides with one of said plurality of predetermined integration start timings, performing the following steps:

detecting a vibration of at least one of a water channel and an object coupled thereto and capable of transmitting vibration, integrating over a predetermined time period each time interval for which a vibration level of the detected vibration exceeds a predetermined level, and interrupting the integration upon expiration of the predetermined time period, thereby obtaining a plurality of integration values corresponding to the integration performed in each predetermined time period; and selecting a minimum value of the plurality of integration values obtained by integrating during each of said plurality of predetermined time periods;

comparing one minimum value with a preset reference value; and determining a presence of water leakage when the minimum value exceeds the reference value and an absence of water leakage when the minimum value is smaller than the reference value.

9. The method according to claim 8, wherein the step of determining the presence/absence of water leakage comprises selecting a minimum value of n integration values obtained by an n-time integration whenever the integrating step is repeated n times, comparing the integration value with the preset reference value, and determining the presence of water leakage when the minimum value exceeds the reference value and the absence of water leakage when the minimum value is smaller than the reference value.

10. The method according to claim 8, wherein the step of determining the presence/absence of water leakage comprises selecting a minimum value of m integration values obtained by the m-time integration including a current integration cycle whenever the integrating step is repeated m times, comparing the integration value with the preset reference value, and determining the presence of water leakage when the minimum value exceeds the reference value and the absence of water leakage when the minimum value is smaller than the reference value.

11. The method according to claim 8, wherein the integrating step is repeated in nighttime.

12. The method according to claim 8, wherein the integrating step is performed at least once in a time range of a day which has a lowest noise level and is repeated a plurality of days, thereby obtaining the plurality of integration values.

13. The method according to claim 8, wherein the integrating step comprises:

converting the vibration detected by the vibration detection step into a signal and amplifying an absolute value of the signal;

comparing with a predetermined reference value level a signal level of the signal whose absolute value is amplified; and integrating a time interval for which the signal whose absolute value is amplified exceeds the reference level.

14. The method according to claim 8, wherein the integrating step comprises:

converting the vibration detected by the vibration detection step into a signal and amplifying an absolute value of the signal;

comparing with a predetermined reference level a signal level of the signal whose absolute value is amplified, and outputting a pulse signal for a time interval when the signal level exceeds the predetermined reference level; and counting the number of pulses included in the pulse signal within the predetermined period of time.

15. A water leakage detecting apparatus comprising:

vibration detection means for detecting a vibration of at least one of a water channel and an object acoustically coupled thereto;

vibration level detection means, connected to said vibration detection means, for detecting if a vibration level of the vibration detected by said vibration detection means exceeds a predetermined vibration level;

integration means, connected to said vibration level detection means, for integrating over a predetermined time period each time interval for which the vibration level exceeds the predetermined vibration level in response to an output signal from said vibration level detection means;

control means for controlling said integration means and causing said integration means to perform the integration a plurality of times to obtain a plurality of integration values; and determination means for receiving the plurality of integration values obtained from said integration means, selecting a minimum value of the plurality of integration values, comparing the minimum value with a predetermined reference value, and for, when the minimum value exceeds the reference value, determining a presence of water leakage, and when the minimum value is smaller than the reference value, determining an absence of water leakage.

16. The apparatus according to claim 15, wherein said determination means selects a minimum value of n integration values obtained by an n-time integration whenever said integration means performs the integration n times, compares the minimum value with the preset reference value, and determines the presence of water leakage when the minimum value exceeds the preset reference value and the absence of water leakage when the minimum value is smaller than the preset reference value.

17. The apparatus according to claim 15, wherein said determination means selects a minimum value of m integration values obtained by m-time integration including a current integration cycle whenever the integration of said integration means is completed, compares the minimum value with the preset reference value, and determines the presence of water leakage when the minimum value exceeds the preset reference value and the absence of water leakage when the minimum value is smaller than the preset reference value.

18. The apparatus according to claim 15, wherein said vibration level detection means comprises:

amplifying means for amplifying an absolute value of an output signal from said vibration detection means;

means for comparing the output signal from said vibration detection means with a predetermined reference level, and outputting a signal of logic level "1" when the output signal from said amplifying means exceeds the reference value;

pulse signal generating means for outputting a pulse signal having a predetermined period;

gate circuit means, connected to said pulse signal generating means, for gating the pulse signal when the signal of logic level "1" is output within the predetermined period of time; and counting means for counting a number of pulse signals included in an output signal from said gate circuit means.

* * * * *

UNITED STATES PATENT AND TRADEMARK OFFICE
CERTIFICATE OF CORRECTION

PATENT NO. : 4,958,296

DATED : September 18, 1990

INVENTOR(S) : Susumu Saitoh et al

It is certified that error appears in the above-identified patent and that said Letters Patent is hereby corrected as shown below:

The title page, showing the number of Drawing Sheets, should be deleted and substitute therefor the attached title page.

Signed and Sealed this

Twenty-first Day of April, 1992

Attest:

HARRY F. MANBECK, JR.

*Attesting Officer*     *Commissioner of Patents and Trademarks*

United States Patent [19]

Saitoh et al.

[11] Patent Number: 4,958,296
[45] Date of Patent: Sep. 18, 1990

[54] WATER-LEAKAGE DETECTING APPARATUS AND METHOD WHICH ARE LITTLE INFLUENCED BY NOISE

[75] Inventors: Susumu Saitoh; Syozo Taniguchi; Akio Enomoto; Teruyoshi Matsuzawa, all of Tokyo, Japan

[73] Assignee: Kabushiki Kaisha Toshiba, Kawasaki, Japan

[21] Appl. No.: 472,434

[22] Filed: Jan. 31, 1990

Related U.S. Application Data

[63] Continuation of Ser. No. 222,410, Jul. 21, 1988, abandoned.

[30] Foreign Application Priority Data

Jul. 22, 1987 [JP] Japan ............................... 62-180939

[51] Int. Cl.$^5$ .............................................. G01M 3/08
[52] U.S. Cl. ...................................... 364/509; 340/605; 73/40; 73/40.5 A; 73/592
[58] Field of Search ............... 364/508, 509, 510, 574, 364/575; 340/604, 605, 683; 73/40, 40.5 A, 49.1, 49.2 R, 49.3, 592

[56] References Cited

U.S. PATENT DOCUMENTS 3,019,650  2/1962  Worswick .................... 73/290 Z

FOREIGN PATENT DOCUMENTS 60-209117  10/1985  Japan .
61-223628   4/1986  Japan .
61-213647   9/1986  Japan .
62-55539    3/1987  Japan .

*Primary Examiner*—Kevin J. Teska
*Assistant Examiner*—Brian M. Mattson
*Attorney, Agent, or Firm*—Oblon, Spivak, McClelland, Maier & Neustadt

[57] ABSTRACT

A sensor detects a vibration generated due to water leakage. An integration circuit integrates time intervals for which a signal obtained by absolute-value amplifying an output signal from the sensor exceeds a predetermined level within a predetermined period of time. The integration circuit performs the integration a plurality of times. A detection circuit selects a minimum value of a plurality of integration values obtained by the plurality of measurements as an integration value obtained when the influence of unrelated noise is at a minimum and compares the minimum value with a preset reference value. When the minimum value exceeds the reference value, the detection circuit determines the presence of water leakage, and when the minimum value is smaller than the reference value, determines the absence of water leakage.

18 Claims, 7 Drawing Sheets